United States Patent
Ye

(10) Patent No.: US 10,142,279 B2
(45) Date of Patent: Nov. 27, 2018

(54) METHOD AND SYSTEM FOR PRESENTING A LISTING OF MESSAGE LOGS

(71) Applicant: Tencent Technology (Shenzhen) Company Limited, Shenzhen (CN)

(72) Inventor: Hao Ye, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 364 days.

(21) Appl. No.: 14/963,550

(22) Filed: Dec. 9, 2015

(65) Prior Publication Data
US 2016/0094509 A1  Mar. 31, 2016

Related U.S. Application Data

(63) Continuation of application No. PCT/CN2014/093115, filed on Dec. 5, 2014.

(30) Foreign Application Priority Data

Dec. 30, 2013 (CN) .......................... 2013 1 0740209

(51) Int. Cl.
G06F 15/16 (2006.01)
H04L 12/58 (2006.01)
H04L 29/08 (2006.01)

(52) U.S. Cl.
CPC .............. *H04L 51/32* (2013.01); *H04L 51/16* (2013.01); *H04L 67/306* (2013.01)

(58) Field of Classification Search
CPC ...... H04L 12/581; H04L 51/04; H04L 12/586
See application file for complete search history.

(56) References Cited

U.S. PATENT DOCUMENTS 9,485,348 B2 * 11/2016 Jeong ..................... G06F 3/0486
2006/0114878 A1 * 6/2006 Choe ..................... H04W 74/02
370/346

(Continued)

FOREIGN PATENT DOCUMENTS

CN          1989497 A    6/2007
CN        101379785 A    3/2009

(Continued)

OTHER PUBLICATIONS

Tencent Technology, ISRWO, PCT/CN2014/093115, Mar. 11, 2015, 7 pgs.

(Continued)

*Primary Examiner* — Krisna Lim
(74) *Attorney, Agent, or Firm* — Morgan, Lewis & Bockius LLP

(57) ABSTRACT

A computing device with processor(s) and memory obtains user-specific models corresponding to a user of the computing device, where the user-specific models are configured to determine respective listing priorities for message logs based on a respective set of parameters generated based at least in part on previous behavioral data corresponding to the user. The computing device obtains a request from the user to display a listing of message logs with message logs of at least two distinct message types. In response to obtaining the request, the computing device: determines listing priorities for the message logs in the listing of message logs according to user-specific models corresponding to the least two distinct message types; determines a presentation order for the listing of message logs based on the determined listing priorities and a prioritization preference of the user; and presents the listing of message logs in the determined presentation order.

20 Claims, 12 Drawing Sheets

(56) References Cited

U.S. PATENT DOCUMENTS

| | | | | |
|---|---|---|---|---|
| 2008/0281902 A1* | 11/2008 | Kaminsky | ........... | H04L 41/0609 |
| | | | | 709/203 |
| 2010/0217808 A1* | 8/2010 | Benninger | .............. | H04L 51/04 |
| | | | | 709/206 |
| 2011/0196733 A1* | 8/2011 | Li | .......................... | G06Q 30/02 |
| | | | | 705/14.42 |
| 2012/0271765 A1* | 10/2012 | Cervenka | ................ | G06Q 20/12 |
| | | | | 705/44 |
| 2013/0066716 A1 | 3/2013 | Chen et al. | | |
| 2014/0095627 A1* | 4/2014 | Romagnino | ............ | H04L 67/24 |
| | | | | 709/206 |
| 2017/0243251 A1* | 8/2017 | Weiser | ............... | G06Q 30/0267 |

FOREIGN PATENT DOCUMENTS

| | | | |
|---|---|---|---|
| CN | 101571874 A | 11/2009 |
| CN | 102469090 A | 5/2012 |
| CN | 102999634 A | 3/2013 |

OTHER PUBLICATIONS

Tencent Technology, IPRP, PCT/CN2014/093115, Jul. 5, 2016, 5 pgs.

* cited by examiner

METHOD AND SYSTEM FOR PRESENTING A LISTING OF MESSAGE LOGS

PRIORITY CLAIM AND RELATED APPLICATIONS

This application is a continuation application of PCT Patent Application No. PCT/CN2014/093115, entitled "METHOD AND SYSTEM FOR PRESENTING A LISTING OF MESSAGE LOGS" filed on Dec. 5, 2014, which claims priority to Chinese Patent Application No. 201310740209.7, entitled "METHOD AND APPARATUS FOR PRESENTING A LISTING OF DIALOGUES," filed on Dec. 30, 2013, both of which are incorporated by reference in their entirety.

TECHNICAL FIELD

The present disclosure relates to the field of Internet technologies, and in particular, to a method and system for presenting a listing of message logs.

BACKGROUND

With the popularization of the Internet and the rapid development of mobile terminals, instant messaging and social media applications have become an essential part of daily life. People may contact both real life friends and strangers by using instant messaging applications. In order to visually depict recent conversations, a recent conversation list is usually used to display contacts or groups that the user has frequently or recently contacted. The recent conversation list may be obtained by sorting the contacts or the groups according to time when a latest message was sent.

SUMMARY

At least the following problem(s) exist in the prior art: In the art, conversations or dialogues are displayed based on a time order. Thus, when messages occur frequently in a group conversation to which a user belongs, the group conversation stays at the top of the conversation list for a long time. However, if the user has not participated in the conversation, display of the recent conversation at a top position on the conversation list may be troublesome to the user. As another example, in a case where the user previously conversed with a contact or group frequently but has not done so recently, the contact or the group is adjusted to the bottom of the conversation list, which brings inconvenience to the user during management of conversations with the contact or the group.

In some embodiments, a method of presenting a listing of message logs (e.g., a listing of conversations, chats, dialogues, and/or chains of other types of communications) is performed at a computing device (e.g., client device 104, FIGS. 1 and 3) with one or more processors and memory. The method includes obtaining a plurality of user-specific models corresponding to a respective user of the computing device, where each of the plurality of user-specific models is configured to determine respective listing priorities for message logs based on a respective set of parameters generated based at least in part on previous behavioral data corresponding to the respective user, and where the plurality of user-specific models at least includes a first model corresponding to a first message type, and a second model corresponding to a second message type distinct from the first message type. The method includes obtaining a request from the respective user to display a listing of message logs corresponding to the respective user, where the listing of message logs at least includes a first message log of the first message type and a second message log of the second message type distinct from the first message type. In response to obtaining the request, the method includes: determining a first listing priority for the first message log based on the first model corresponding to the first message type; determining a second listing priority for the second message log based on the second model corresponding to the second message type; determining a presentation order for the listing of message logs corresponding to the respective user based at least in part on the first listing priority, the second listing priority, and a prioritization preference of the respective user for two or more message types including at least the first message type and the second message type; and presenting the listing of message logs corresponding to the respective user in the determined presentation order.

In some embodiments, a computing device (e.g., server system 108, FIGS. 1-2; client device 104, FIGS. 1 and 3; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, FIGS. 1-2; client device 104, FIGS. 1 and 3; or a combination thereof) with one or more processors, cause the computing device to perform, or control performance of, the operations of any of the methods described herein. In some embodiments, a computing device (e.g., server system 108, FIGS. 1-2; client device 104, FIGS. 1 and 3; or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
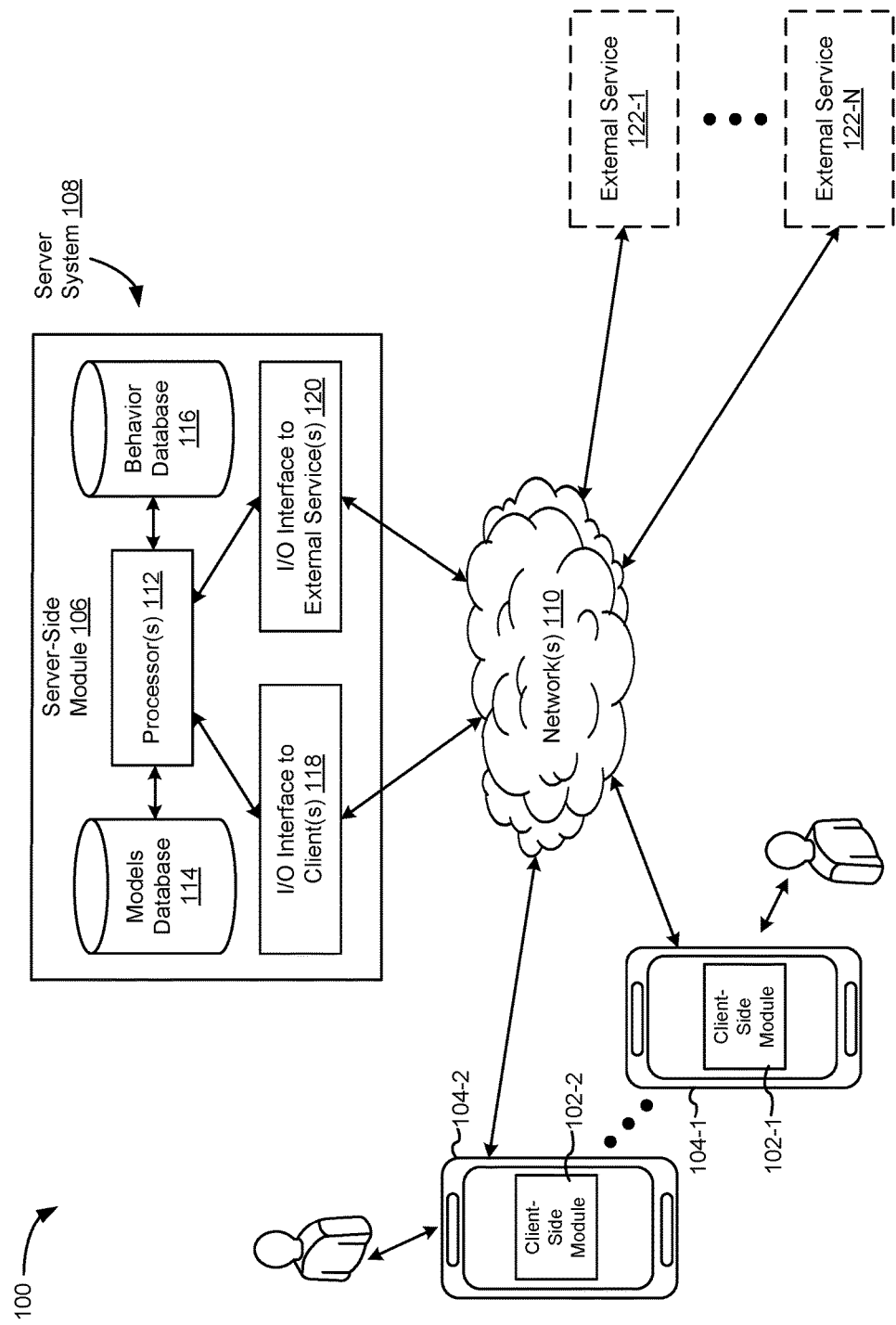
FIG. 1 is a block diagram of a server-client environment in accordance with some embodiments.

As shown in FIG. 1, data processing for a social networking application is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking application and communications with server-side module 106. Server-side module 106 provides server-side functionalities for the social networking application for any number of client modules 102 each residing on a respective client device 104.

In some embodiments, server-side module 106 includes one or more processors 112, models database 114, behavior database 116, an I/O interface to one or more clients 118, and an I/O interface to one or more external services 120. I/O interface to one or more clients 118 facilitates the client-facing input and output processing for server-side module 106. In some embodiments, processor(s) 112 generate and update user-specific models based on behavior data corresponding to respective users of the social networking application, where a respective user-specific model is configured to determine respective listing priorities for message logs of a respective message type. Models database 114 stores a plurality of user-specific models for each user of the social networking application, and behavior database 116 stores behavioral data for each user of the social networking application, where the behavioral data corresponds to a respective user's interactions with a presented listing of message logs. I/O interface to one or more external services 120 facilitates communications with one or more external services 122 (e.g., banking services, online shopping services, account settlement services, application hosting, web hosting, or cloud-based services such as video and/or image hosting and storage websites).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of server system 108, the corresponding actions performed by client device 104 would be apparent to ones skilled in the art without any creative efforts. Furthermore, some aspects of the present technology may be performed by server system 108, client device 104, or server system 108 and client device 104 cooperatively.

Figure 2:
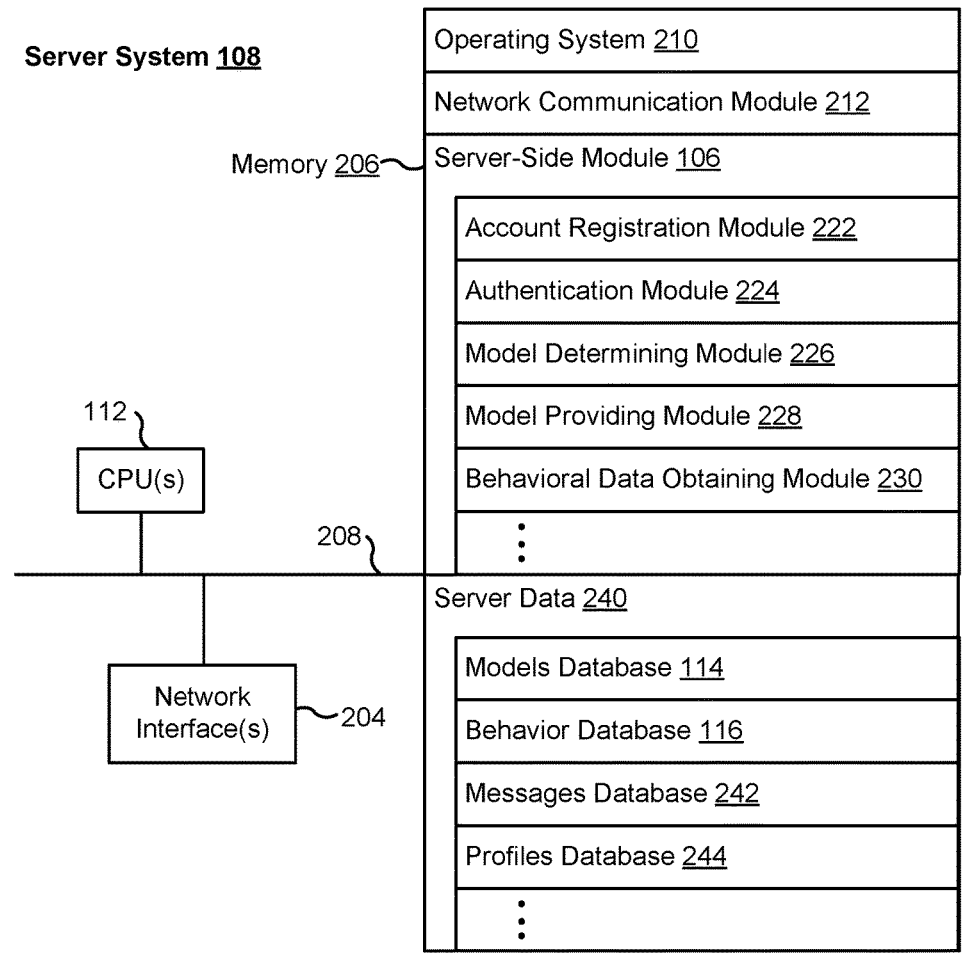
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and external service(s) 122) connected to one or more networks 110 via one or more network interfaces 204 (wired or wireless);
- server-side module 106, which provides server-side data processing and functionalities for the social networking application, including but not limited to:
  - account registration module 222 for registering a user account for the social networking application;
  - authentication module 224 for performing an authentication process to validate a user account to access the social networking application;
  - model determining module 226 for generating user-specific models and updating user-specific models stored in models database 114 based on obtained behavioral data;
  - model providing module 228 for providing one or more user specific models to a client device 104; and
  - behavioral data obtaining module 230 for obtaining behavioral data from a client device 104; and
- server data 240 storing data for the social networking application, including but not limited to:
  - models database 114 storing a plurality of user-specific models for each user of the social networking application;
  - behavior database 116 storing behavioral data for each user of the social networking application, where the behavioral data corresponds to a respective user's interactions with a presented listing of message logs;
  - messages database 242 storing messages sent by users in the social networking application; and
  - profiles database 244 storing user profiles for users of the social networking application, where a respective user profile for a user includes a user identifier (e.g., an account name or handle), login credentials to the social networking application, (optionally) payment data (e.g., linked credit card information, app credit or gift card balance, billing address, shipping address, etc.), an IP address or preferred contact information, messages prioritization preference, group chat(s) subscribed to, contacts list (i.e., followed public and private accounts), custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
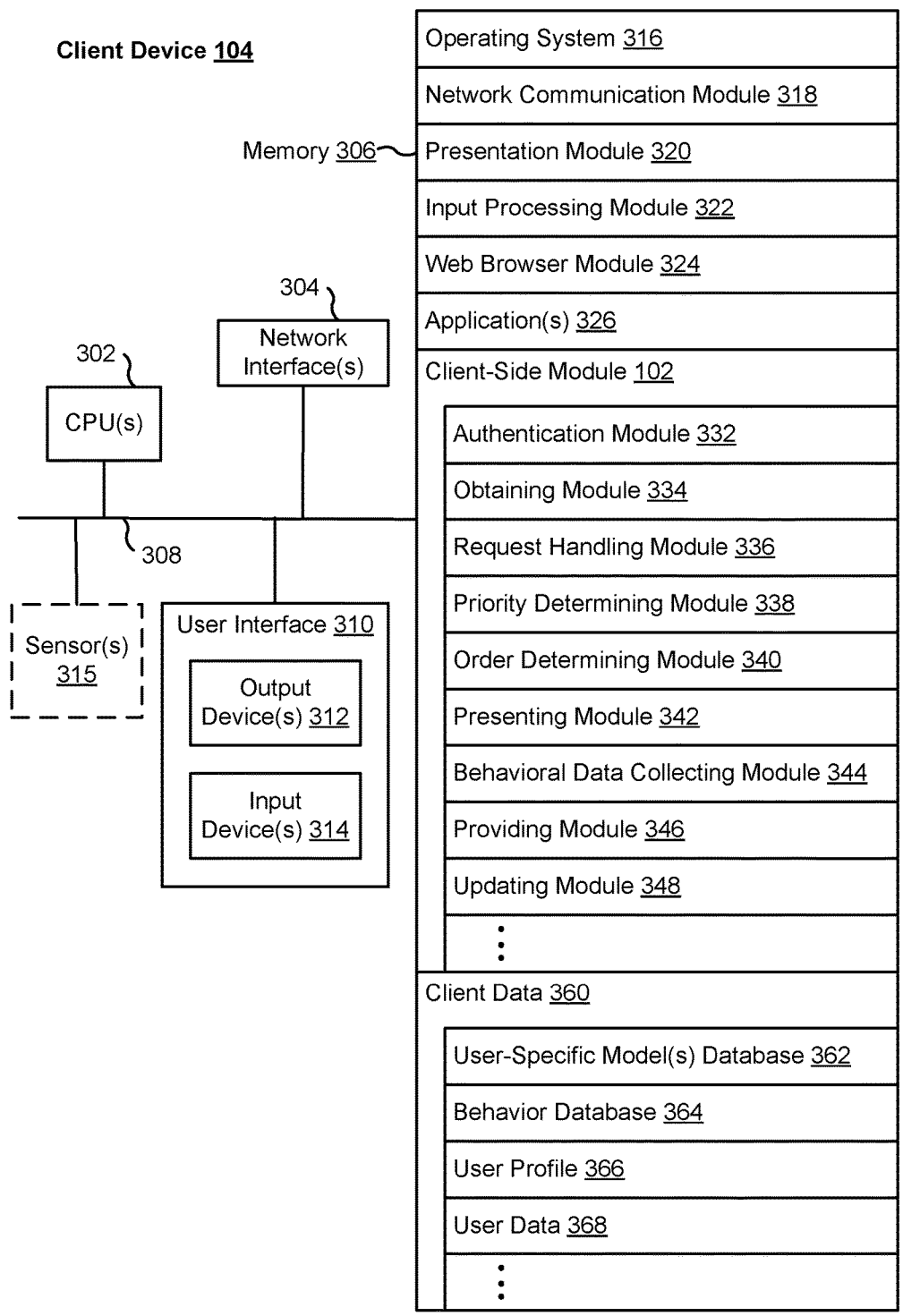
FIG. 3 is a block diagram of a client device in accordance with some embodiments.

FIG. 3 is a block diagram illustrating a representative client device 104 associated with a user (e.g., a merchant, or a user requesting payment) in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 optionally includes one or more sensors 315, which provide context information as to the current state of client device 104 or the environmental conditions associated with client device 104. Sensor(s) 315 include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108 and external service(s) 122) connected to one or more networks 110 via one or more network interfaces 304 (wired or wireless);

presentation module 320 for enabling presentation of information (e.g., a user interface for application(s) 326 or the social networking application, widgets, websites and web pages thereof, and/or games, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

web browser module 324 for navigating, requesting (e.g., via HTTP), and displaying websites and web pages thereof;

one or more applications 326 for execution by client device 104 (e.g., games, application marketplaces, payment platforms, and/or other web or non-web based applications);

client-side module 102, which provides client-side data processing and functionalities for the social networking application, including but not limited to:
  authentication module 332 for authenticating the user of client device 104 to access his/her respective user account in the social networking application;
  obtaining module 334 for obtaining one or more user-specific models from server system 108;
  request handling module 336 for handling a request from the user of client device 104 to display a listing of message logs;
  priority determining module 338 for determining a listing priority for each message log in the listing of message logs based on the one or more user-specific models;
  order determining module 340 for determining a presentation order for the listing of message logs based at least in part on the listing priorities determined by priority determining module 338 and a priority preference of the user of client device 104;
  presenting module 342 for presenting the listing of message logs corresponding in the presentation order determined by order determining module 340;
  behavioral data collecting module 344 for collecting behavioral data corresponding to the user's interactions with the presented listing of message logs, generating an abstraction of the collected behavioral data based on respective sets of parameters for the plurality of user-specific models, and determining a set of behavioral data to be collected based on the respective sets of parameters for the plurality of user-specific models;
  providing module 346 for providing the abstraction of the collected behavioral data to server system 108; and
  updating module 348 for updating the user-specific models stored in user specific model(s) database 362; and
client data 360 storing data associated with the social networking application, including, but is not limited to:
  user specific model(s) database 362 storing one or more user specific models corresponding to the user of client device 104;
  behavior database 364 storing raw and/or abstracted behavioral data collected by behavioral data collecting module 344;
  user profile 366 storing a user profile for the user of client device 104, including, but not limited to, a user identifier (e.g., an account name or handle), login credentials to the social networking application, (optionally) payment data (e.g., linked credit card information, app credit or gift card balance, billing address, shipping address, etc.), an IP address or preferred contact information, messages prioritization preference, group chat(s) subscribed to, contacts list (i.e., followed public and private accounts), custom parameters for the user (e.g., age, location, hobbies, etc.), and identified trends and/or likes/dislikes of the user; and
  user data 368 storing data authored, saved, liked, or chosen as favorites by the user of client device 104 in the social networking application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4:
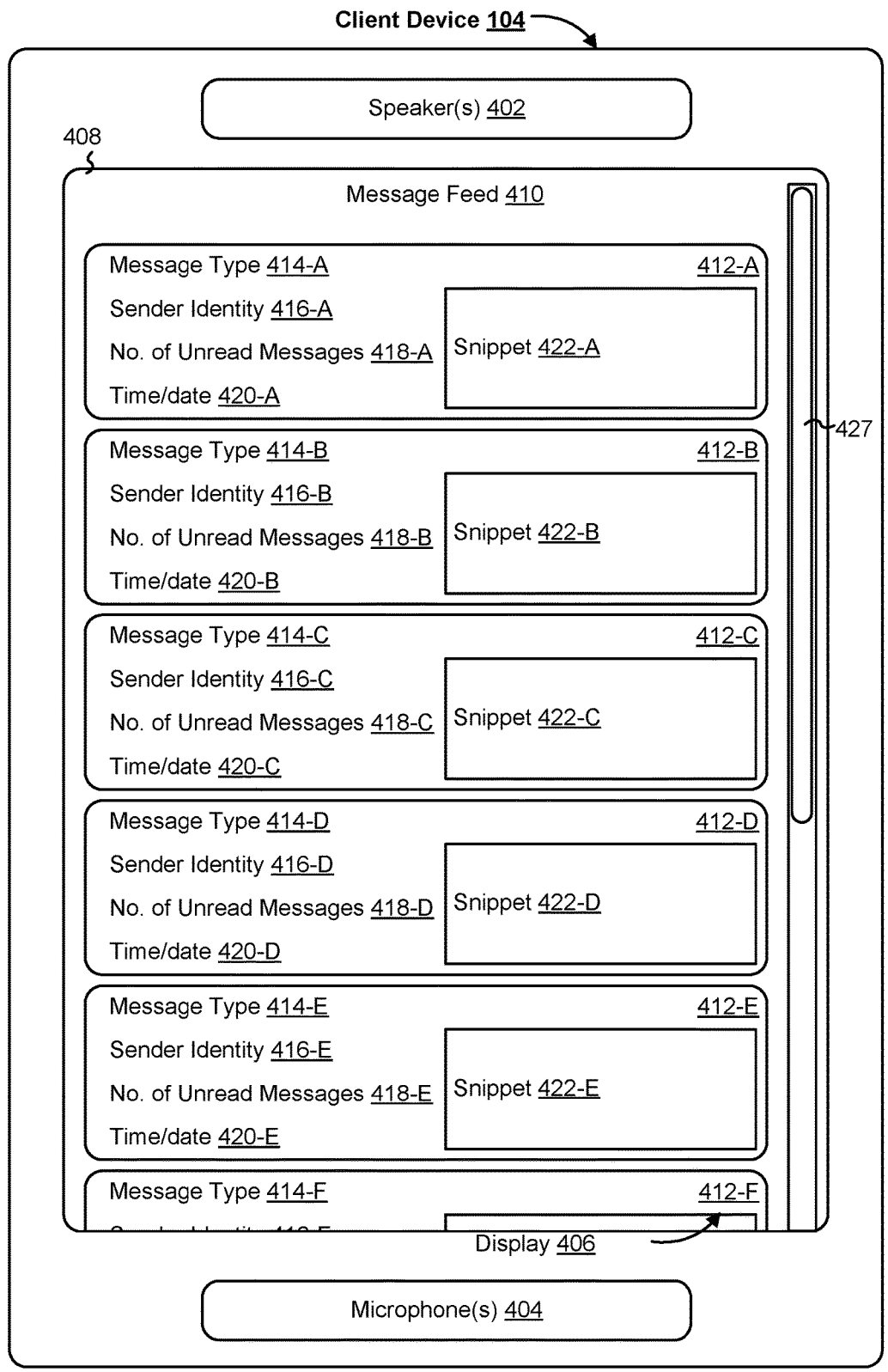
FIG. 4 illustrates an exemplary user interface for presenting a listing of message logs in accordance with some embodiments.

FIG. 4 shows interface 408 for the social networking application displayed on client device 104 (e.g., a mobile phone) with one or more speakers 402, one or more microphones 404, and a display 406 (e.g., a touch screen display); however, one skilled in the art will appreciate that the user interface shown in FIG. 4 may be implemented on other similar computing devices. The user interface 408 displayed on display 406, in FIG. 4, is used to illustrate the processes described herein, including the methods and processes described with respect to FIGS. 5-7 and 8A-8C.

For example, the user of client device 104 launches or executes the social networking application on his/her client device 104. In one example, after launching the social networking application, a home user interface is displayed on display 406, and the user navigates to a message feed 410 that displays a listing of message logs. In another example, after launching the social networking application, messages feed 410 is automatically displayed on display 406.

FIG. 4 illustrates client device 104 displaying message feed 410 with a listing of message logs 412 on display 406. In some embodiments, each message log 412 corresponds to one or more messages sent to and/or sent by the user of client device 104. For example, the user of client device 104 is able to view messages corresponding to message log 412-B by performing a tap gesture at a location anywhere within the area for message log 412-B or by clicking anywhere within the area for message log 412-B. For example, the user of client device 104 is able to view the balance of message feed 410 by performing a scrolling gesture on display 406 or by using scroll bar 427 to scroll downwards.

In FIG. 4, each message log 412 includes a message type indicator 414 displaying the message type (e.g., post within the social networking application by a followed public account, post within the social networking application by a private contact, public group message board, private message board or group chat, one-on-one instant message conversation, and the like) corresponding to a respective message log 412. In FIG. 4, each message log 412 also includes sender identity 416 displaying an identifier (e.g., a user account name or handle within the social networking application) corresponding a sender of a most recent message within the respective message log 412, the sender(s) of unread messages within the respective message log 412, or the like. In FIG. 4, each message log 412 further includes an indicator 418 corresponding to a count of unread messages within the respective message log 412. In FIG. 4, each message log 412 further includes a time and/or date 420 of a most recent message within the respective message log 412. In FIG. 4, each message log 412 further includes a snippet or preview 422 of unread or recent messages within the respective message log 412.

Figure 5:
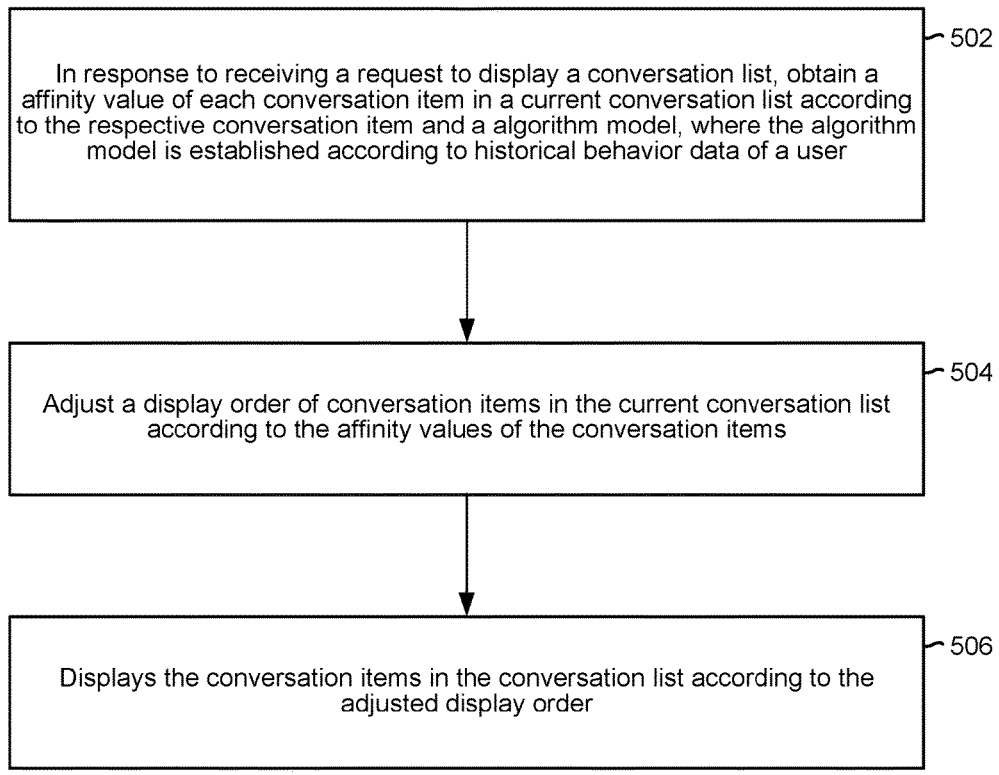
FIG. 5 illustrates a flowchart diagram of a method of displaying a conversation list (or more generally speaking, a "listing of message logs") in accordance with some embodiments.

FIG. 5 illustrates a flowchart diagram of a method 500 of displaying a conversation list in accordance with some embodiments. In some embodiments, method 500 is performed by a terminal with one or more processors and memory. For example, in some embodiments, method 500 is performed by client device 104 (FIGS. 1 and 3) or a component thereof (e.g., client-side module 102, FIGS. 1 and 3). In some embodiments, method 500 is governed by instructions that are stored in a non-transitory computer readable storage medium and the instructions are executed by one or more processors of the terminal.

In some embodiments, data processing for a social networking application is implemented in client-server environment 100 (FIG. 1) with a server system 108 and client-side module 102 executed on one or more client devices 104. In some embodiments, server system 108 (FIGS. 1-2) manages and operates the social networking application. In some embodiments, a respective client-side module 102 (FIGS. 1 and 3) is associated with a user account in the social networking application that corresponds to a user of client device 104 (FIGS. 1 and 3).

In response to receiving a request to display a conversation list, the terminal obtains (502) an affinity value of each conversation item in a current conversation list according to the respective conversation item and an algorithm model, where the algorithm model is established according to historical behavior data of a user. In some embodiments, the conversation list refers to a conversation list in an instant messaging application, where the conversation list includes conversation items for interaction between the user of the terminal and contacts (i.e., individuals or contact groups). In some embodiments, the conversation list may also be a private message log, a comment log, or the like in a social networking service (SNS) community. In some embodiments, the terminal determines the affinity values. In some embodiments, the terminal receives the affinity values from a server.

The terminal adjusts (504) a display order of conversation items in the current conversation list according to the affinity values of the conversation items. In some embodiments, the display order refers to an order in which the conversation items are displayed in the conversation list.

The terminal displays (506) the conversation items in the conversation list according to the adjusted display order. In some embodiments, the conversation list may be refreshed according to a refresh instruction from the terminal. As such, in some embodiments, the conversation list displayed in operation 506 is triggered by each refresh or may be refreshed at preset intervals.

In method 500, an affinity model is established for conversation items of recent contacts by using a regression model of machine learning, so as to effectively predict a degree of concern for each conversation item by a user. The conversation items are intelligently sorted by using computation results of the model, so as to dynamically adjust positions of the conversation items. For example, a lower weight may be intelligently assigned to a group conversation in which the user has a low degree of participation to keep the group conversation at an appropriate position in the conversation list, so that no excessive disturbance is caused to the user. For example, a higher weight may be intelligently assigned to a conversation item of high concern (e.g., a conversation that the user recently replied to) to keep the conversation item at a conspicuous position in the list of recent contacts, thereby facilitating search by the user. Through consideration of many factors, such as frequency and time attenuation of message transmission and reception, a degree of concern for conversation items can be adjusted dynamically to satisfy demands of the user to the greatest extent. Thus, the flexibility of the conversation list is greatly improved, and the user experience is enhanced.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600 and 800, and process 700) are also applicable in an analogous manner to method 500 described above with respect to FIG. 5.

Figure 6:
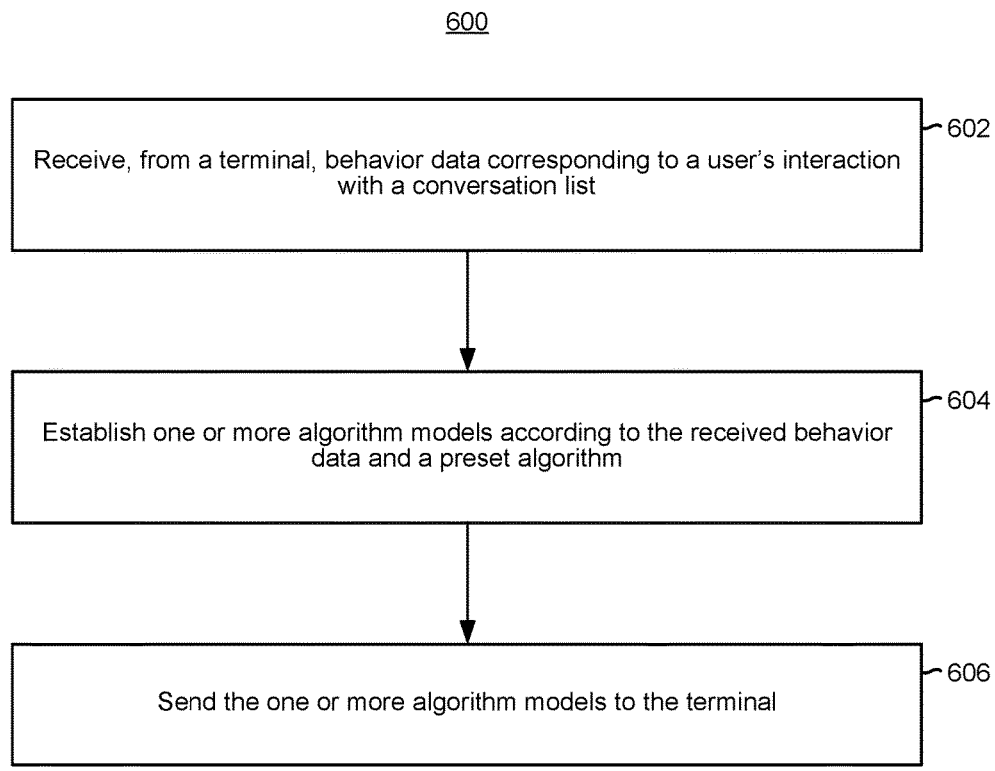
FIG. 6 illustrates a flowchart diagram of a method of displaying a conversation list (or more generally speaking, a "listing of message logs") in accordance with some embodiments.

FIG. 6 illustrates a flowchart diagram of a method 600 of displaying a conversation list in accordance with some embodiments. In some embodiments, method 600 is performed by a server with one or more processors and memory. For example, in some embodiments, method 600 is performed by server system 108 (FIGS. 1-2) or a component thereof (e.g., server-side module 106, FIGS. 1-2). In some embodiments, method 600 is governed by instructions that are stored in a non-transitory computer readable storage medium and the instructions are executed by one or more processors of the server.

In some embodiments, data processing for a social networking application is implemented in client-server environment 100 (FIG. 1) with a server system 108 and client-side module 102 executed on one or more client devices 104. In some embodiments, server system 108 (FIGS. 1-2) manages and operates the social networking application. In some embodiments, a respective client-side module 102 (FIGS. 1 and 3) is associated with a user account in the social networking application that corresponds to a user of client device 104 (FIGS. 1 and 3).

The server receives (602) behavior data corresponding to a user's interaction with a conversation list from a terminal.

The server establishes (604) one or more algorithm models according to the received behavior data and an algorithm. In some embodiments, the algorithm is a regression algorithm (e.g., a linear or logic regression algorithm), a classification algorithm, or the like. In the description of embodiments, the regression algorithm is used as an example.

The server sends (606) the one or more algorithm models to the terminal, so that the terminal obtains an affinity value of each conversation item in a current conversation list of the terminal according to the algorithm model and adjusts a display order of the conversation items in the conversation list according to the affinity values of the conversation items.

In method 600, an affinity model is established for conversation items of recent contacts by using a regression model of machine learning, so as to effectively predict a degree of concern for each conversation item by a user. The conversation items are intelligently sorted by using computation results of the model, so as to dynamically adjust positions of the conversation items. For example, a lower weight may be intelligently assigned to a group conversation in which the user has a low degree of participation to keep the group conversation at an appropriate position in the conversation list, so that no excessive disturbance is caused to the user. For example, a higher weight may be intelligently assigned to a conversation item of high concern (e.g., a conversation that the user recently replied to) to keep the conversation item at a conspicuous position in the list of recent contacts, thereby facilitating search by the user. Through consideration of many factors, such as frequency and time attenuation of message transmission and reception, a degree of concern for conversation items can be adjusted dynamically to satisfy demands of the user to the greatest extent. Thus, the flexibility of the conversation list is greatly improved, and the user experience is enhanced.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 800, and process 700) are also applicable in an analogous manner to method 600 described above with respect to FIG. 6.

Figure 7:
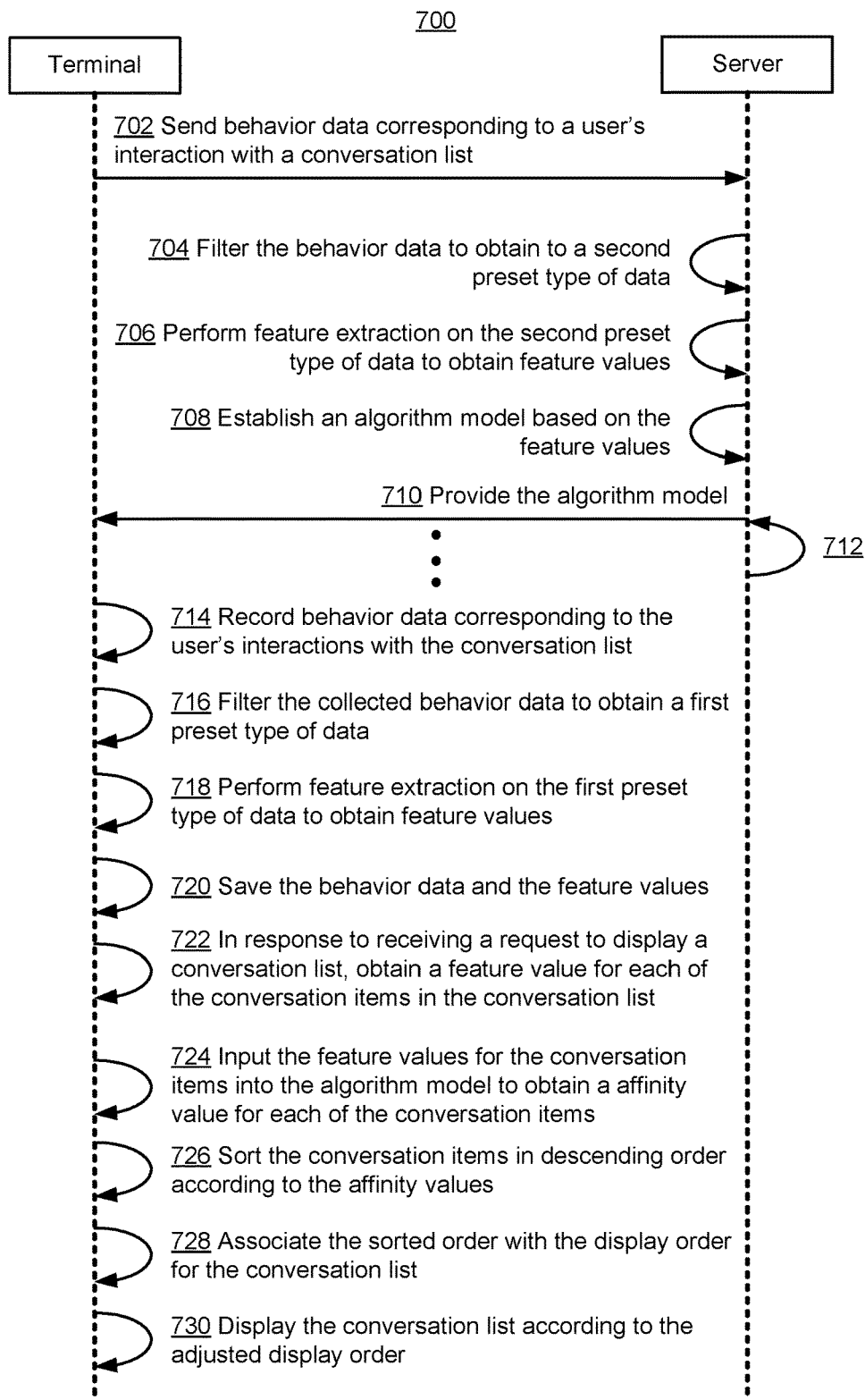
FIG. 7 illustrates a flow diagram of a process for displaying a conversation list (or more generally speaking, a "listing of message logs") in accordance with some embodiments.

FIG. 7 illustrate a flow diagram of a process 700 for displaying a conversation list in accordance with some embodiments. In some embodiments, process 700 is performed at least in part by a server with one or more processors and memory, and a terminal with one or more processors and memory. For example, in some embodiments, the server is server system 108 (FIGS. 1-2) or a component thereof (e.g., server-side module 106, FIGS. 1-2), and the terminal is client device 104 (FIGS. 1 and 3) or a component thereof (e.g., client-side module 102, FIGS. 1 and 3).

In some embodiments, data processing for a social networking application is implemented in client-server environment 100 (FIG. 1) with a server system 108 and client-side module 102 executed on one or more client devices 104. In some embodiments, server system 108 (FIGS. 1-2) manages and operates the social networking application. In some embodiments, a respective client-side module 102 (FIGS. 1 and 3) is associated with a user account in the social networking application that corresponds to a user of client device 104 (FIGS. 1 and 3).

The terminal sends (702) behavior data corresponding to a user's interactions with a conversation list to the server. In some embodiments, the conversation list includes a plurality of conversation items (sometimes also herein called "message logs") accessed via a social networking application. For example, during an alpha test of the social networking application, the server requests behavior data from the terminal. After recording the behavior data, the terminal sends the behavior data corresponding to a user's interactions with the conversation list to the server. Continuing with this example, after receiving the requested behavior data, the server establishes an algorithm model according to the received behavior data. In some embodiments, the behavior data may result from an interaction such as messaging, commenting, and replying with another user during use of the social networking application. In some embodiments, the behavior data may include: context data when the user initiates a conversation or replies to a conversation with another user in the social networking application, which includes, but is not limited to, data corresponding to visible conversation items displayed in the conversation list, data generated when the user selects a conversation item in the displayed conversation list, data corresponding to time of a latest message of each conversation item, and/or the like.

The server may request the behavior data from the terminal in any one of the following manners: (1) By using an application program alpha test protocol, request the user to submit the behavior data to the server; or (2) In a manner of purchase from the user, request the user to send the behavior data to the server. The request manner is not limited to the two foregoing manners. For privacy protection purposes, in some embodiments, the behavior data does not include message content corresponding to the user's interactions.

When receiving the behavior data sent by the terminal, the server filters (704) the behavior data to obtain a second preset type of data. Because the behavior data includes a lot of content, in order to simplify subsequent analysis, some types of data may be filtered out from the behavior data. Specifically, in some embodiments, operation 704 includes: When receiving the behavior data sent by the terminal, the server filters the behavior data according to the second preset type to obtain behavior data corresponding to multiple preset data types and uses the obtained behavior data as the second preset type of data. In some embodiments, the second preset type may be a visible conversation item in a current conversation list, click situations of a conversation item, a contact corresponding to a conversation item, the number of messages sent between the user and a contact, the time when a message was sent, whether there is a reply after a conversation is initiated, and/or the like. It should be noted that, in some embodiments, multiple feature groups may be set, and each feature group includes multiple data types, so as to obtain, from the behavior data, a feature that can represent a conversation item in a conversation list. For example, if a feature group is an interaction frequency of a conversation between a user and a contact, data types corresponding to the feature group may be the number of messages sent between the user and the contact, time when a message was sent, and the like.

The server performs (706) feature extraction on the second preset type of data to obtain feature values corresponding to the second preset type of data. In some embodiments, the feature extraction process is performed to abstract original (i.e., raw) behavior data. By using an interaction frequency of a conversation between the user and a certain contact as an example, behavior data obtained after the filtering operation 704 is the number of messages sent by the user to the contact and the number of messages sent by the contact to the user. Continuing with this example, a discretized numerical feature value is obtained after feature extraction, which is used for describing the magnitude of conversation frequency. By using a position of a click by the user as another example, after feature extraction, instead of a specific position of the click, a general position (e.g., an upper portion or a lower portion) where the click is located on the screen may be obtained.

The server establishes (708) an algorithm model based on the feature values. In order to obtain situations such as a change rule of and a correspondence between a behavior and a conversation item according to the behavior data provided by the terminal, the server constructs an algorithm model according to the feature values obtained according to the behavior data. Specifically, in some embodiments, operation 708 includes: Establishing the algorithm model by using a method of machine learning and by applying the algorithm according to the feature values. Certainly, in some embodiments, the algorithm model may be a model established based on a regression algorithm (e.g., a linear or logic regression algorithm) or may be a model based on a classification algorithm.

The server sends (710) the algorithm model to the terminal. In order to sort conversation items in a conversation list, the terminal needs to compute affinity values for the conversation items by using the algorithm model. Therefore, the server sends the established algorithm model to the terminal.

In some embodiments, after sending the algorithm model to the terminal, the server may further perform operation 712 to update the algorithm model.

The server updates (712) the algorithm model during each update period according to behavior data. In some embodiments, the update period may refer to a data update period or a feature update period. For a data update period, with the use of the model, an increasing amount of data can be used to verify or adjust the model. Therefore, the terminal may continue to send behavior data to the server, and the server updates the algorithm model in each data update period according to the received behavior data. For a feature update period, with the use of the model, it is possible that some features that were not previously involved become useful to verify or adjust the model. Therefore, the algorithm model is updated in each feature update period according to an additional preset type of data newly added in the feature update period and the previously received behavior data (e.g., the behavior data received in the alpha test stage).

For a data update period, the update process may include the process shown in (1.1) to (1.3):

(1.1) The server filters, according to a data update period, behavior data received within the data update period, so as to obtain a third preset type of data from the behavior data.

In order to simplify a subsequent process of updating the algorithm model, when a data update period of the algorithm model is reached, the server needs to filter the third preset type of data from the behavior data received within the data update period. In some embodiments, the third preset type of data may include results of displaying and clicking the conversation list. For example, the results of displaying and clicking the conversation list can visually reflect whether a prediction made by using the model is consistent with an actual usage habit of the user and accuracy of the model. Therefore, an objective of verifying the algorithm model can be achieved by obtaining the third preset type of data. For example, behavior data corresponding to an interaction whereby a user of clicks a conversation may include a position of a click, time of a click, and the number of clicks. If the third preset type of data includes a position of a click, after the server filter the behavior data, the obtained third preset type of data includes a position of a click on the conversation list by the user.

(1.2) The server performs feature extraction on the third preset type of data to obtain feature values corresponding to the third preset type of data. This process is the same as described above in operation 706 and is not described again for the sake of brevity.

(1.3) The server inputs the feature values into the algorithm model, and trains the algorithm model to obtain an updated algorithm model. In some embodiments, with interactions of the user becoming diverse, a result obtained by using the algorithm model may deviate from an actual situation to some extent. Therefore, the algorithm model needs to be trained continuously according to newly added data. Specifically, after obtaining the feature values corresponding to the third preset type of data, the server inputs the feature values into the algorithm model, and trains the algorithm model by using the feature values. For example, the server trains the algorithm model by using feature values corresponding to the conversation list, a feature value corresponding to a click result, and a feature value corresponding to a process from when the terminal receives a conversation list display request to when the user completes the click on the conversation list, thereby obtaining an updated preset model.

For a feature update period, the update process may include the process shown in (2.1) to (2.3):

(2.1) The server filters the behavior data according to a fourth preset type newly added within a feature update period, so as to obtain the fourth preset type of data from the behavior data. In order to correctly predict a sorted order of conversation items in the conversation list, the server may add some new data types based on the second preset type of data to update the algorithm model. For that purpose, the server needs to filter the behavior data of according to a fourth preset type of data. Specifically, when a feature update period of the algorithm model is reached, the server filters the previously received behavior data according to a fourth preset type newly added within the feature update period, and uses behavior data corresponding to the fourth preset type as the fourth preset type of data.

For example, behavior data corresponding to an interaction between the user and a contact within a preset period of time may include a conversation proportion, the number of messages sent by the user, the number of messages sent by the contact, content of a message sent by the user, and/or content of a message sent by the object. For example, when the model is first established, it is possible that the conversation proportion or the content of the message sent by the user is not used as data for establishing the model. In this case, with the use of the model, the two types of data may also affect the accuracy of the model. Therefore, during the update, the two types of data may be obtained through filtering operation (2.1) and used for updating the model.

(2.2) The server performs feature extraction on the fourth preset type of data to obtain feature values corresponding to the fourth preset type of data. This process is the same as described above in operation 706 and is not described again for the sake of brevity.

(2.3) The server trains the algorithm model according to the feature values to obtain an updated algorithm model. Specifically, after obtaining the feature values corresponding to the fourth preset type of data, the server trains the algorithm model by inputting the feature values to obtain an updated algorithm model. Certainly, in the process of updating the algorithm model according to a feature update period, behavior data newly sent by the user in a process of using the algorithm model may also be introduced, and a specific update process is the same as the foregoing update process. After updating the algorithm model, the server sends the updated algorithm model to the terminal, so that the terminal may obtain affinity values of conversation items in the conversation list according to the updated algorithm model and adjust the display order of conversation items in the conversation list according to the affinity values.

In some embodiments, after the server completes the update of the algorithm model, the server sends the updated algorithm model to the terminal. The server sends the updated algorithm model to the terminal in any one of the following manners: (1) When an entire social networking application is updated, the server sends the updated algorithm model to the terminal at the same time, and the terminal updates the algorithm model by using a received file of the updated algorithm model; or (2) After updating the algorithm model, the server pushes update reminder information to the terminal, so that a reminder box pops up on the terminal to remind the user to download a file with the algorithm model, and the terminal updates the algorithm model of an social networking application by using the file of the algorithm model downloaded by the user. For example, the update reminder information is used for reminding the user of the terminal of the availability of the update file. Certainly, the manner in which the server sends the updated algorithm model to the terminal is not limited to the foregoing two manners.

The foregoing is a process of establishing a model by the server, and after the server sends the model to the terminal, the terminal may sort, by using the model, the conversation items until the model is later updated. After the algorithm model is obtained by the terminal, the terminal performs operation 714.

The terminal records (714) the behavior data corresponding to the user of the terminal's interaction with the conversation list. Specifically, in real time by running a log module inside the social networking application, the terminal records behavior data corresponding to the user's interaction with the conversation list such as data corresponding to a position clicked by the user on the interface displayed on the terminal and data corresponding to time when the position is clicked. For example, the behavior data may be used for an alpha test, or may be subsequently used by the user in practice, or may be used in a process of updating the model and the like.

In some embodiments, after recording the behavior data, the terminal may further perform operations 716-720 on the behavior data:

The terminal filters (716) the collected behavior data to obtain a first preset type of data from the behavior data. Because the behavior data includes a lot of content, in order to simplify a subsequent analysis and reduce the amount of saved behavior data, some types of data may be filtered out from the behavior data. In order to determine a part that needs to be filtered out from the behavior data, the terminal may preset multiple data types, and then filters the behavior data according to the preset data types. Specifically, in some embodiments, operation 716 includes: After recording the behavior data sent in real time, the terminal filters the behavior data according to the first preset type to obtain behavior data corresponding to a data type selected in advance, thereby obtaining the first preset type of data. It should be noted that when the terminal filter the behavior data, the first preset type of the terminal may be the same as the second preset type used by the server used operation 704, or may be different from the used second preset type. The preset data types of the server and the terminal are not limited to the types mentioned herein. Meanwhile, for the second preset type and the first preset type, "first" and "second" are merely used to distinguish between entities and do not imply a preset order.

The terminal performs (718) feature extraction on the first preset type of data to obtain feature values. This process is the same as described above in operation 706 and is not described again for the sake of brevity.

It should be noted that, in some embodiments, operations 716-718 may also be performed by the server. That is, the server filters the behavior data to obtain a first preset type of data, and the server performs feature extraction on the first preset type of data to obtain feature values. For a specific process, reference may be made to operations 704-706, which are not described again for the sake of brevity.

The terminal saves (720) the recorded behavior data and the feature values corresponding to the collected behavior data. In order to subsequently update the algorithm model, the terminal saves the behavior data and the feature values and sends the behavior data and/or the feature values to the server when a data update period is reached, so that the server may update the algorithm model according to the received data.

It should be noted that the terminal may have a log database for saving behavior data and corresponding feature values (e.g., behavior database 364, FIG. 3). In some embodiments, the database is indexed based on contacts, interaction types, and/or conversation item types. The log database is a sub-module which runs inside an application and does not need to report data through a network connection. The log database may be updated all together during a system update, or may be updated by reminding a user to download a database file. The log database may be saved in a physical storage device for persistence purposes. As such, when the application is restarted, the log database from a recent period of time may be loaded and restored from the storage device. The saving duration and the maximum amount of data needing to be saved by the log database may be set by a technician during development or may be adjusted by the user.

After receiving the algorithm model established by the server or after receiving the updated algorithm model, the terminal performs operations 722-730.

In response to receiving a request to display a conversation list, the terminal obtains (722) a feature value for each of the conversation items in the current conversation list. Specifically, in some embodiments, operation 722 includes: when the user clicks or refreshes the conversation list or the user logs into the social networking application, the terminal receives the display request and, in response, obtains, from an operation log database, a feature value related to each of the conversation items. For example, a feature for a respective conversation item in the conversation list is the number of historical conversations with a contact corresponding to the respective conversation item, time of a historical conversation, or the like. Certainly, in some embodiments, when the social networking application is started, the sorting may be performed directly on the current conversation list based on the feature values saved in the operation log database, and previous related user behavior data may be restored. In this way, at the first operation of the user after the social networking application is started, a display order of the conversation items can be predicted in real time.

The terminal inputs (724) the feature values corresponding to each conversation item into the algorithm model to obtain an affinity value for each of the conversation items in the current conversation list. In order to correctly predict the affinity value of each conversation item, the terminal needs to use the algorithm model and the feature value corresponding to each conversation item to obtain the affinity values. Specifically, in some embodiments, operation 724 includes: After obtaining the feature values corresponding to the conversation items, the terminal inputs the feature values into the algorithm model sent by the server to obtain the affinity values of the conversation items, and the terminal uses the affinity value as the affinity values of the conversation items in the current conversation list. For example, the greater the affinity value is, the higher the affinity is between the user and a contact corresponding to the conversation item.

It should be noted that the affinity values of the conversation items may be multiple continuous or discrete values. For example, when the server uses a regression algorithm to establish the algorithm model, the terminal inputs the feature values of the conversation items into the regression model and performs computation according to the regression model to obtain the affinity values of the conversation items that are multiple continuous values. In another example, when the server uses a classification algorithm to establish the algorithm model, the terminal inputs the feature values of the conversation items into the classification model and performs computation according to the classification model to obtain the affinity values of the conversation items that are multiple discrete values. In this case, the terminal may classify several discrete levels for the affinity of conversations to identify the affinity of the conversation items.

The terminal sorts (726) the conversation items in a descending order according to the affinity values. For example, when the server uses a regression algorithm to establish the algorithm model, the terminal inputs the feature values of the conversation items into the regression model and performs computation according to the regression model to obtain the affinity values of the conversation items that are multiple continuous values. Therefore, after obtaining the affinity values of the conversation items in the current conversation list, the terminal sorts the obtained affinity values of the conversation items in a descending order, so as to obtain an order of the affinity values of the conversation items. Then, the terminal sorts, according to the order of the affinity values of the conversation items, the conversation items corresponding to the affinity values of the conversation items.

In another example, when the server uses a classification algorithm to establish the algorithm model, the terminal inputs the feature values of the conversation items into the classification model and performs computation according to the classification model to obtain the affinity values of the conversation items that are multiple discrete values. Therefore, after obtaining the affinity values of the conversation items in the current conversation list, the terminal sorts the obtained affinity values of the conversation items in a descending order, so as to obtain an order of the affinity values of the conversation items.

Then, the terminal sorts, according to the order of the affinity values of the conversation items, the conversation items corresponding to the affinity values of the conversation items. When affinity values of two or more conversation items among the conversation items are equal, the terminal further sorts the two or more conversation items in a reverse time order according to the most recent messages corresponding to the two or more conversation items, thereby obtaining a sorted order of the conversation items. That is, conversation items that include more recent messages sent between the user and the contact are positioned closer to the top of the conversation list. In some embodiments, the contact refers to an individual contact or a contact group.

The terminal associates (728) the sorted order with the display order of the conversation items. Specifically, after performing operation 726, the terminal obtains a sorted order of the conversation items and uses the sorted order as the display order of the conversation items.

The terminal displays (730) the conversation items in the conversation list according to the adjusted display order.

It should be noted that operations 712-730 are executed in sequence in the preceding; however, during actual application, operation 712 may be performed after at the same time as the terminal executes any of operations 714-730. In addition, there is no definite sequence between the process of updating a model by the server and the process of using a model by the terminal. The server may perform an update according to a period and send an updated model to the terminal for use, while as long as the terminal obtains any model, the terminal may perform a process of adjusting conversation items according to the model.

In consideration of conserving bandwidth, a real-time computation solution based on client-side machine learning model may be implemented in the present embodiments. Considering compression technologies and that the social networking application (e.g., instant messaging or chat software) must be connected to a network and that the conversation list is not opened frequently, a real-time computation solution based on a server-side machine learning model may also be implemented in the present embodiments. With the server-side implementation, the client of the social networking application only needs to submit user behavior data, and training and update of the machine learning model are all performed at the server cloud. As a trade-off to bandwidth consumption, this solution has the advantage of real-time update of a machine learning model.

In process 700, an affinity model is established for conversation items by using machine learning, so as to effectively predict a degree of concern for each conversation item by a user. The conversation items are intelligently sorted by using computation results of the model, so as to dynamically adjust positions of the conversation items For example, a lower weight may be intelligently assigned to a group conversation in which the user has a low degree of participation to keep the group conversation at an appropriate position in the conversation list, so that no excessive disturbance is caused to the user. For example, a higher weight may be intelligently assigned to a conversation item of high concern (e.g., a conversation that the user recently replied to) to keep the conversation item at a conspicuous position in the list of recent contacts, thereby facilitating search by the user. Through consideration of many factors, such as frequency and time attenuation of message transmission and reception, a degree of concern for conversation items can be adjusted dynamically to satisfy demands of the user to the greatest extent. Thus, the flexibility of the conversation list is greatly improved, and the user experience is enhanced. Further, two modes of model training (e.g., server-side and real-time model clients-side computation) are used in combination, so that a machine learning model training task that requires complex computation is executed on the server end, thereby effectively saving computation resources of the terminal while ensuring accuracy of model computation by the terminal.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, and 800) are also applicable in an analogous manner to process 700 described above with respect to FIG. 7.

Figure 8A:
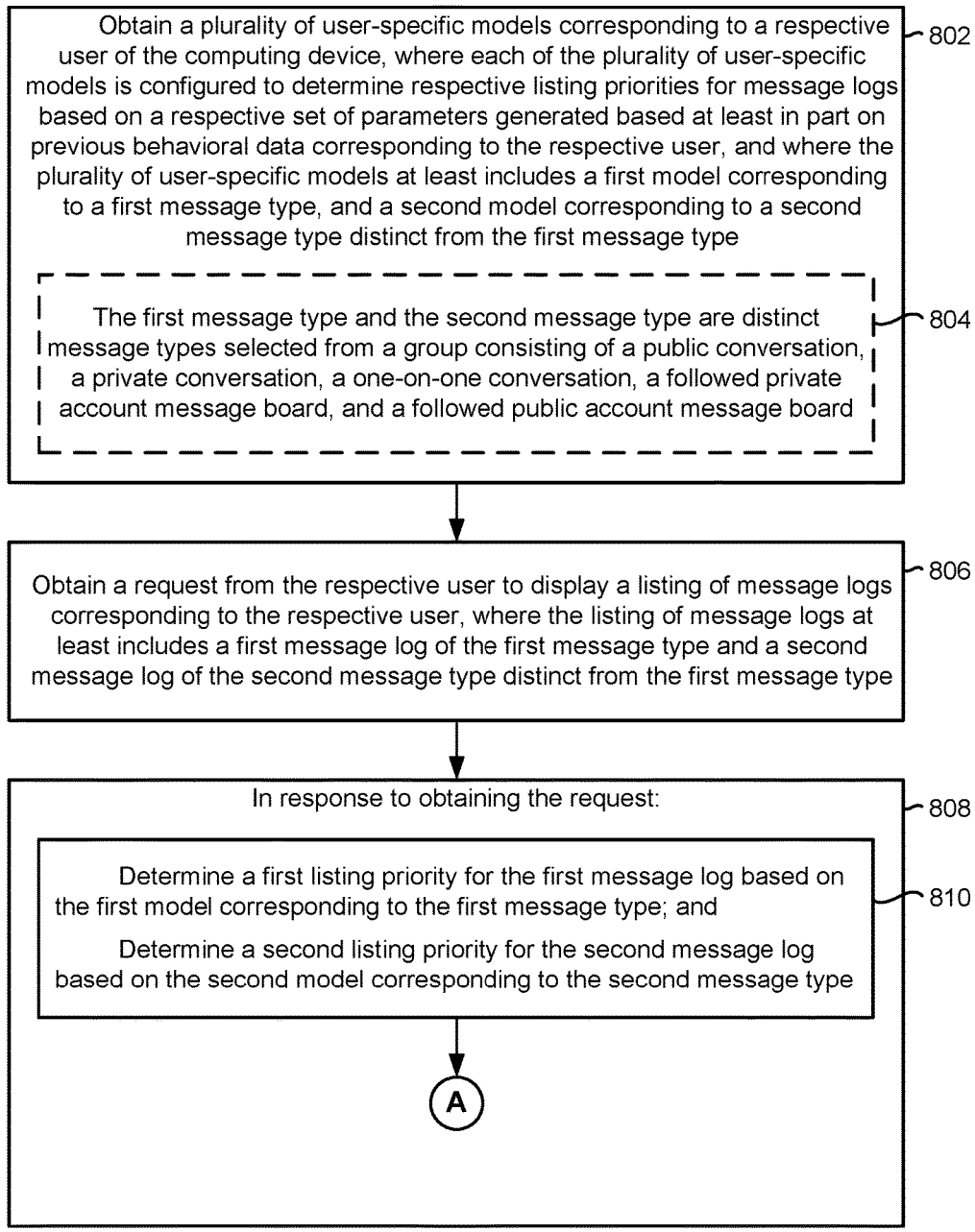
FIGS. 8A-8C illustrate a flowchart diagram of a method of presenting a listing of message logs in accordance with some embodiments.
Figure 8B:
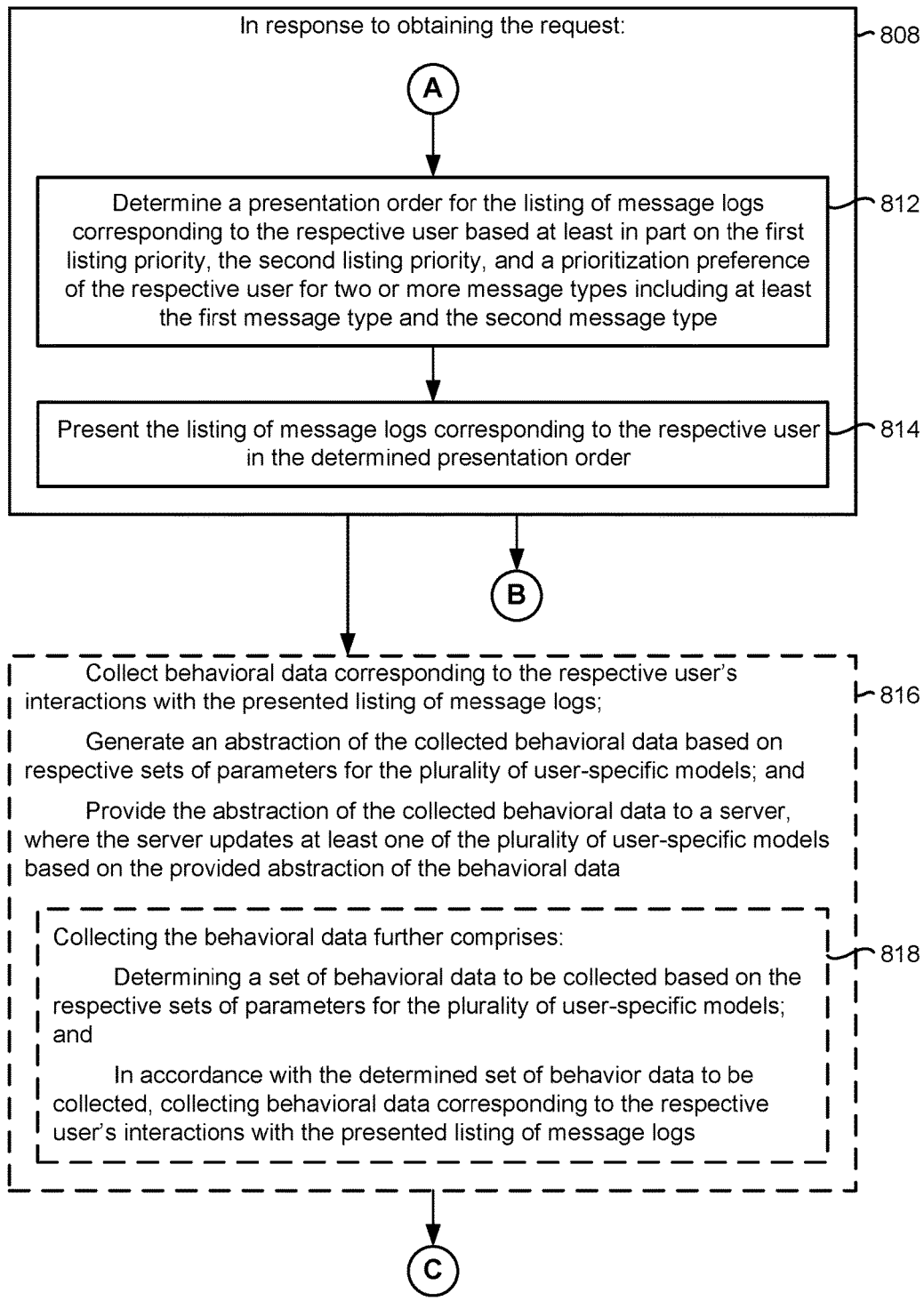
Figure 8C:
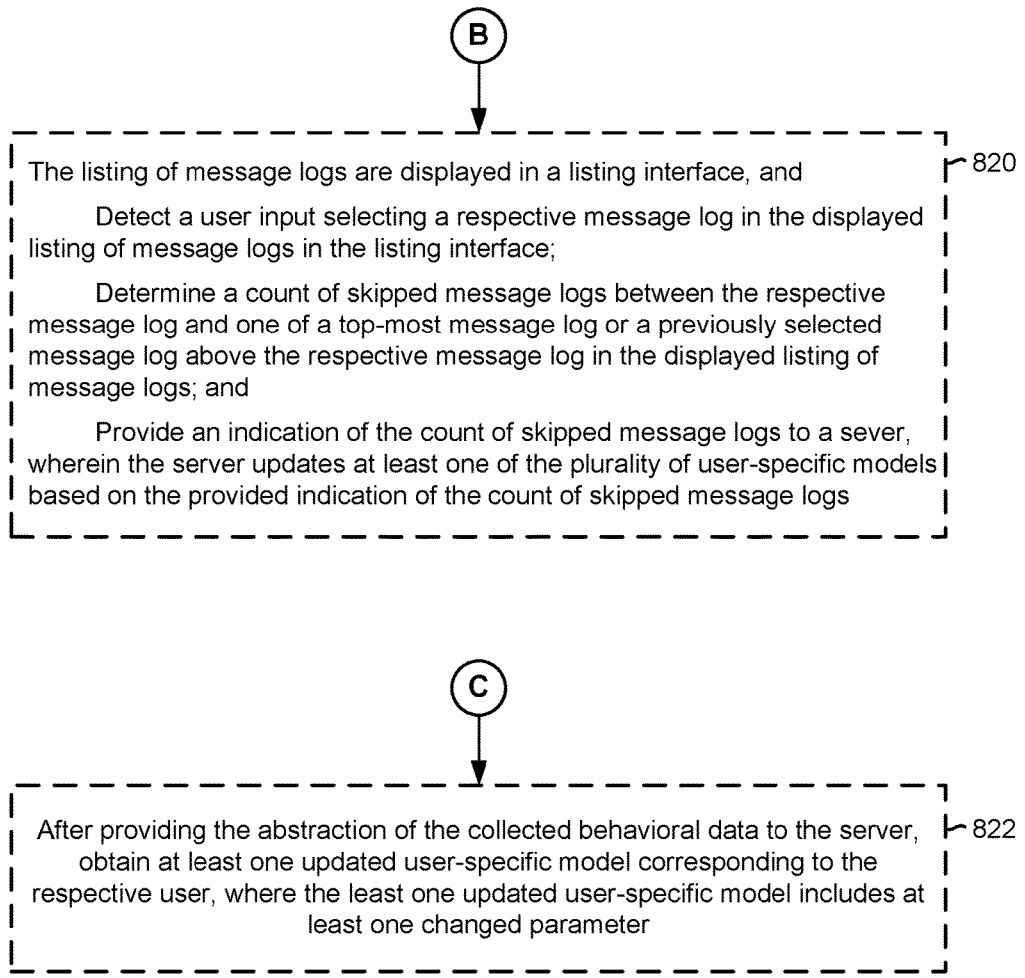

FIGS. 8A-8C illustrate a flowchart diagram of a method 800 of presenting a listing of message logs in accordance with some embodiments. In some embodiments, method 800 is performed by a computing device with one or more processors and memory.

For example, in some embodiments, method 800 is performed by client device 104 (FIGS. 1 and 3) or a component thereof (e.g., client-side module 102, FIGS. 1 and 3). In some embodiments, method 800 is governed by instructions that are stored in a non-transitory computer readable storage medium and the instructions are executed by one or more processors of the computing device. Optional operations are indicated by dashed lines (e.g., boxes with dashed-line borders).

In some embodiments, data processing for a social networking application is implemented in client-server environment 100 (FIG. 1) with a server system 108 and client-side module 102 executed on one or more client devices 104. In some embodiments, server system 108 (FIGS. 1-2) manages and operates the social networking application. In some embodiments, a respective client-side module 102 (FIGS. 1 and 3) is associated with a user account in the social networking application that corresponds to a user of client device 104 (FIGS. 1 and 3).

The computing device obtains (802) a plurality of user-specific models corresponding to a respective user of the computing device, where each of the plurality of user-specific models is configured to determine respective listing priorities for message logs based on a respective set of parameters generated based at least in part on previous behavioral data corresponding to the respective user, and where the plurality of user-specific models at least includes a first model corresponding to a first message type, and a second model corresponding to a second message type distinct from the first message type. In some embodiments, client device 104 or a component thereof (e.g., obtaining module 334, FIG. 3) obtains a plurality of user-specific models corresponding to a user account of a user of client device 104. In some embodiments, client device 104 saves the plurality of user-specific models locally in user-specific models database 362. For example, the models are determined by the computing device itself, or the models are obtained from a server on a periodic basis or upon update of the application provided by the server. In some embodiments, the plurality of user-specific models at least includes a first model corresponding to a first message type (e.g., public conversation) and a second model corresponding to a second message type (e.g., one-on-one instant messaging conversation).

In some embodiments, the first message type and the second message type are (804) distinct message types selected from a group consisting of a public conversation, a private conversation (e.g., a private group conversation with more than two participants), a one-on-one conversation (e.g., a one-on-one private conversation, or a one-on-one conversation that others may join), a followed private account message board, and a followed public account message board.

The computing device obtains (806) a request from the respective user to display a listing of message logs corresponding to the respective user, where the listing of message logs at least includes a first message log of the first message type and a second message log of the second message type distinct from the first message type. In some embodiments, client device 104 or a component thereof (e.g., request handling module 336, FIG. 3) obtains a request from the user of client device 104 to display the listing of message logs. For example, the listing of message logs is the respective user's information feed in the social networking application, and the message logs include public chat room conversations, private group conversations, one-on-one conversations, postings from public accounts followed by the user (e.g., companies, celebrities, sports stars, popular figures, sports teams, news aggregators, and the like), postings and comments by social network contacts, and/or the like.

In response to obtaining (808) the request, the computing device determines (810) a first listing priority for the first message log based on the first model corresponding to the first message type and determines a second listing priority for the second message log based on the second model corresponding to the second message type. In some embodiments, client device 104 or a component thereof (e.g., priority determining module 338, FIG. 3) determines a listing priority (sometimes also herein called an "affinity value") for each of the message logs in the listing of message logs based on user-specific models corresponding to the message types of the message logs in the listing of message logs. For example, the computing device determines a listing priority for one or more message logs of the public conversation message type according to a first user-specific model corresponding to the public conversation message type and determines a listing priority for one or more message logs of the one-on-one conversation message type according to a second user-specific model corresponding to the one-on-one conversation message type.

In response to obtaining (808) the request, the computing device determines (812) a presentation order for the listing of message logs corresponding to the respective user based at least in part on the first listing priority, the second listing priority, and a prioritization preference of the respective user for two or more message types including at least the first message type and the second message type. In some embodiments, client device 104 or a component thereof (e.g., order determining module 340, FIG. 3) determines a presentation order for the message logs in the listing of message logs based on the listing priorities determined by priority determining module 338 for each of the message logs in the listing of message logs and a prioritization preference for the user of client device 104 (e.g., included in the user profile 366, FIG. 3). In some embodiments, the prioritization preference is an overall preference for one item type over the other(s). In some embodiments, the prioritization preference is specified by the respective user or learned over time based on the behavior of the respective user and/or a community of users of the application provided by the server including the respective user. For example, after determining a listing priority for each message log of the public conversation message type according to the first user-specific model and a listing priority for each message log of the one-on-one conversation message type according to the second user-specific model, the computing device determines a presentation order based on the determined listing priorities for the message logs of the public conversation message type and one-on-one conversation message type and a prioritization preference of the user of client device 104 for message logs of the one-on-one conversation message type to be displayed at a higher position than messages logs of the public conversation message type.

In response to obtaining (808) the request, the computing device presents (814) the listing of message logs corresponding to the respective user in the determined presentation order. In some embodiments, client device 104 or a component thereof (e.g., presenting module 342, FIG. 3) presenting the listing of message logs according to the presentation order determined by order determining module 340. FIG. 4, for example, shows client device 104 displaying a message feed 410 with a listing of message logs 412 on display 406. In some embodiments, each message log 412 corresponds to one or more messages sent to and/or sent by the user of client device 104.

In some embodiments, the computing device collects (816) behavioral data corresponding to the respective user's interactions with the presented listing of message logs, generates an abstraction of the collected behavioral data based on respective sets of parameters for the plurality of user-specific models, and provides the abstraction of the collected behavioral data to a server, where the server updates at least one of the plurality of user-specific models based on the provided abstraction of the behavioral data. In some embodiments, client device 104 or a component thereof (e.g., behavioral data collecting module 344, FIG. 3) collects behavioral data corresponding to the respective user's interactions with the presented listing of message logs. In some embodiments, client device 104 or a component thereof (e.g., behavioral data collecting module 344, FIG. 3) performs an abstraction process on the collected behavioral data to generate an abstraction of the collected behavioral data based on respective sets of parameters for the plurality of user-specific models. In some embodiments, client device 104 or a component thereof (e.g., providing module 346, FIG. 3) provides the abstraction of the collected behavioral data to server system 108. For example, the behavioral data includes the display order of the message logs and the message log selected by the user, how long the user perused the selected message log, identities and relationships of users involved in the selected and unselected message logs, scroll down gestures or operations, hover or idle time on a displayed portion of the listing, participation or response to message logs and message items inside selected message log by the user, and the like. In some embodiments, the server calculates updated/adjusted models based on the provided behavioral data. In some embodiments, the computing device maintains and updates the models. In some embodiments, after collecting the behavioral data, the client performs an abstraction process on the collected behavioral data before providing it to the server such as computing sums, averages, a summary of events, or other data indicators. As such, the behavioral data is anonymized, and the server does not receive the raw behavioral data.

In some embodiments, collecting the behavioral data further comprises (818): determining a set of behavioral data to be collected based on the respective sets of parameters for the plurality of user-specific models; and, in accordance with the determined set of behavior data to be collected, collecting behavioral data corresponding to the respective user's interactions with the presented listing of message logs. In some embodiments, the computing device limits the collected behavioral data to the parameters of the models. In some embodiments, the computing device identifies additional behavioral data to be collected so as to refine the models.

In some embodiments, the listing of message logs are displayed in a listing interface, and the computing device (820): detects a user input selecting a respective message log in the displayed listing of message logs in the listing interface; determines a count of skipped message logs between the respective message log and one of a top-most message log or a previously selected message log above the respective message log in the displayed listing of message logs; and provides an indication of the count of skipped message logs to a sever, where the server updates at least one of the plurality of user-specific models based on the provided indication of the count of skipped message logs. For example, after displaying message feed 410 with the listing of message logs 412 in FIG. 4, client device 104 detects a user touch input, tap gesture, or a click input at a location corresponding to message log 412-F. Continuing with this example, client device 104 determines a count of skipped message logs between the top of message feed 410 and selected message loge 412-F (e.g., 5 skipped message logs) and provides server system 108 with an indication of the count of skipped message logs.

In some embodiments, after providing the abstraction of the collected behavioral data to the server, the computing device obtains (822) at least one updated user-specific model corresponding to the respective user, where the least one updated user-specific model includes at least one changed parameter. In some embodiments, client device 104 or a component thereof (e.g., obtaining module 334, FIG. 3) obtains at least one updated user-specific model from server system 108. In some embodiments, client device 104 or a component thereof (e.g., updating module 348, FIG. 3) updates user specific model(s) database 362 to include the least on updated user-specific model. In some embodiments, each model is composed of a plurality of parameters. For example, the weight of a parameter is changed, a parameter is added to the model, a parameter is deleted from the model, a formula of the model is changed, and/or the like.

In some embodiments, generating the abstraction of the collected behavior data based on respective sets of parameters for the plurality of user-specific models further comprises: identifying, from the collected behavior data, a subset of behavior data relevant to a first parameter of the first model; identifying a plurality of features present within the subset of behavior data; and abstracting the subset of behavior data based on the first parameter, and the plurality of features. For example, if one of the parameters used in the first model is the hover time before selection for a top ranked message log, the relevant behavior data for this parameter includes all instances where the user has viewed the listing. An abstraction based on this parameter can be "hover time>30 sec (message log 5), hover time=20-30 sec (message logs 1, 7, 4, 9-18), hover time=10-20 sec (message logs 2, 3, 5), hover time 5-10 sec (message logs 6), hover time<5 sec (message logs 4, 5), where the message log ID in the parenthesis is the top-listed message log for at least one listing presented to the user. In this particular example, the abstraction replaces the exact length of the hover times with time intervals. In addition, the abstraction also replaces a record for each time a top-ranked message log was selected by a merely fact that the top-ranked message log was selected at least once. This abstraction reduces the amount of data the server receives and also protects user privacy. For identifying the features present in the subset of behavior data, the user device determines one or more commonalities or peculiarities present in the abstracted or subset of behavior data, and provides information regarding these commonalities and peculiarities as features to the server along with the abstracted data. In some embodiments, some abstracted information can be provided for each of the discovered features, so that the server can decide whether and/or how to modify the existing model. Continuing with the above example, if through analysis of the abstracted data and the subset of behavior data related to the selected top-ranked message logs, the user device discovers that the message log 5 which falls within multiple ones of the time intervals, include a summary for new messages in the listing interface, and the time interval corresponds to the number of new messages described in the summary. The user device optionally abstracts this information and sends it to the server (e.g., the abstracted information include: # of new messages=1, summary length=3 lines→hover time=2-3 sec; # of new messages=2, summary length=3-10→hover time=15-20 sec; # of new messages>2, summary length=10-15→hover time 35 seconds). The server receiving this additional information optionally creates a new parameter or modifies an existing parameter or parameter weight based on summary length or # of messages for the model. For example, the server may take the hover time as a parameter for evaluating how accurate the top-ranking was, and adjust that by the summary length present in the listing. In another example, for the group of instances where the hover time is relatively long, the user device optionally clusters the instances and identifies one or more common features among a majority of these instances, and submits the common feature to the server for consideration as an additional parameter for the model. For example, if more than half of the instances in the group hover time=20-30, the top-ranked message logs includes reposts or comments, rather than original messages or posts, the server optionally creates a parameter based on whether the new message is an original post to lower the priority of the message logs that only contain reposts and comments.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 600, and process 700) are also applicable in an analogous manner to method 800 described above with respect to FIGS. 8A-8C.

Figure 9:
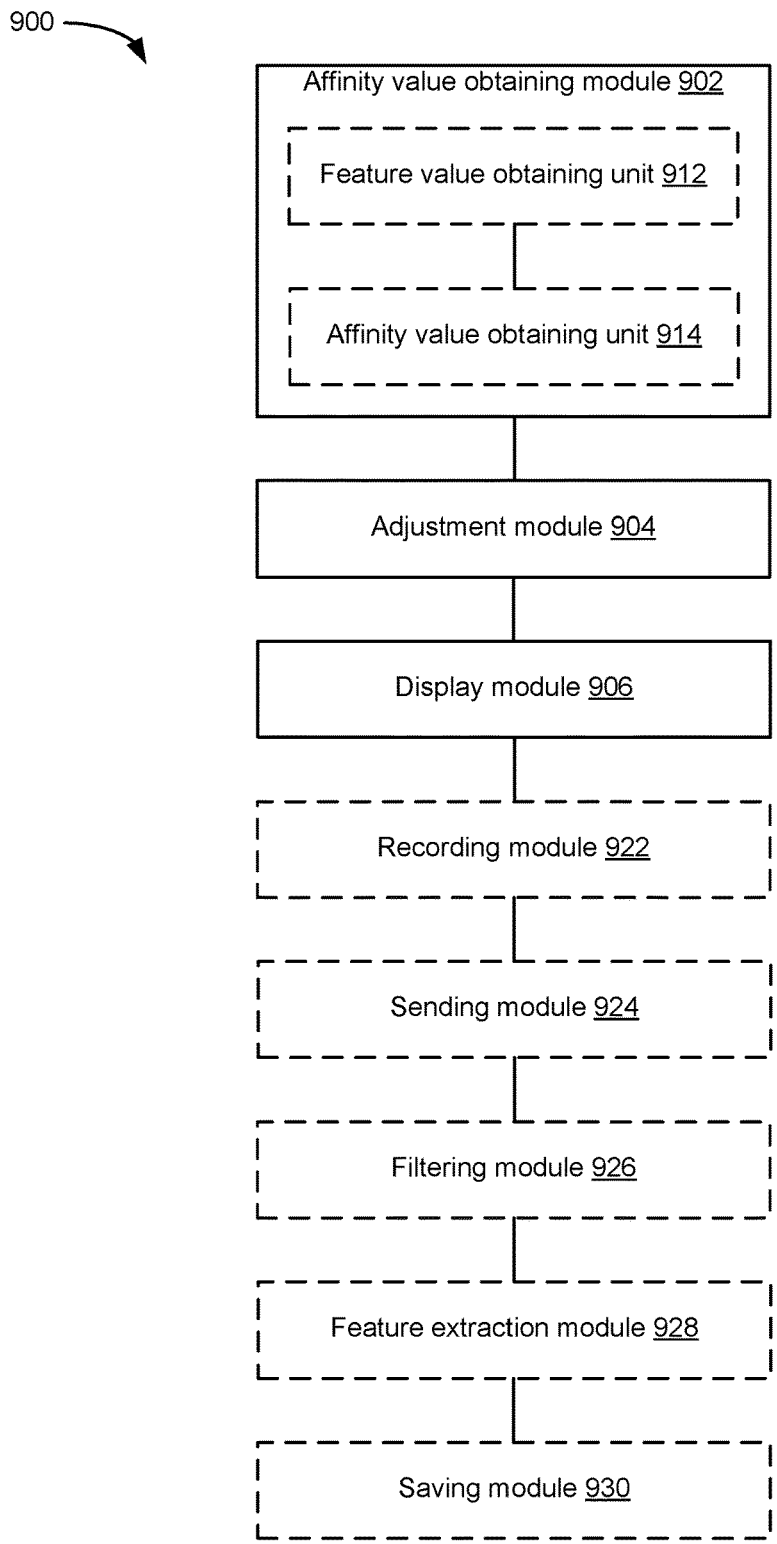
FIG. 9 is a block diagram of a client-side apparatus for displaying a conversation list (or more generally speaking, a "listing of message logs") in accordance with some embodiments.

FIG. 9 is a block diagram of a client-side apparatus 900 for displaying a conversation list in accordance with some embodiments. In some embodiments, client-side apparatus 900 may be implemented in whole or in part by software, hardware, or a combination thereof. For example, client-side apparatus 900 corresponds to client device 104 (FIGS. 1 and 3) or a component thereof (e.g., client-side module 102, FIGS. 1 and 3). In some embodiments, client-side apparatus 900 includes: affinity value obtaining module 902, adjustment module 904, and display module 906.

In some embodiments, affinity value obtaining module 902 is configured to obtain an affinity value of each conversation item in a current conversation list.

In some embodiments, affinity value obtaining module 902 includes: feature value obtaining unit 912 and affinity value obtaining unit 914.

In some embodiments, feature value obtaining unit 912 is configured to obtain a feature value for each conversation item in the conversation list. Optionally, the feature value obtaining unit 912 is used to perform feature extraction on current conversation data of each conversation item in the current conversation list, so as to obtain the feature value corresponding to the conversation item in the current conversation list; or the feature value obtaining unit 912 is used to obtain, for any conversation item in the current conversation list, historical conversation data of the conversation item from a conversation log database, and perform feature extraction on current conversation data of the conversation item and the historical conversation data, so as to obtain the feature value corresponding to the conversation item in the current conversation list.

In some embodiments, affinity value obtaining unit 914 is configured to input the feature values obtained by feature value obtaining unit 912 into the algorithm model for computation, so as to obtain the affinity value of the conversation items in the current conversation list.

In some embodiments, adjustment module 904 is configured to adjust a display order of the conversation items in the current conversation list according to the affinity values of the conversation items. Optionally, adjustment module 904 is used to sort the conversation items in a descending order of the affinity values, and use the sorted order as a display order of the conversation items.

In some embodiments, display module 906 is configured to display the conversation items in the conversation list according to the adjusted display order.

In some embodiments, client-side apparatus 900 further includes: recording module 922, sending module 924, filtering module 926, feature extraction module 928, and saving module 930.

In some embodiments, recording module 922 is configured to record behavior data corresponding to the user's interactions with the conversation list.

In some embodiments, sending module 924 is configured to send the behavior data collected by recording module 922 to server-side apparatus 1000, so that the server-side apparatus 1000 establishes or updates the algorithm model according to the received behavior data.

In some embodiments, filtering module 926 is configured to filter the behavior data according to a first preset type of data to obtain the first preset type of data.

In some embodiments, feature extraction module 928 is configured to perform feature extraction on the first preset type of data to obtain feature values from the behavior data.

In some embodiments, saving module 930 is configured to save the behavior data and/or the feature values corresponding to the behavior data.

Figure 10:
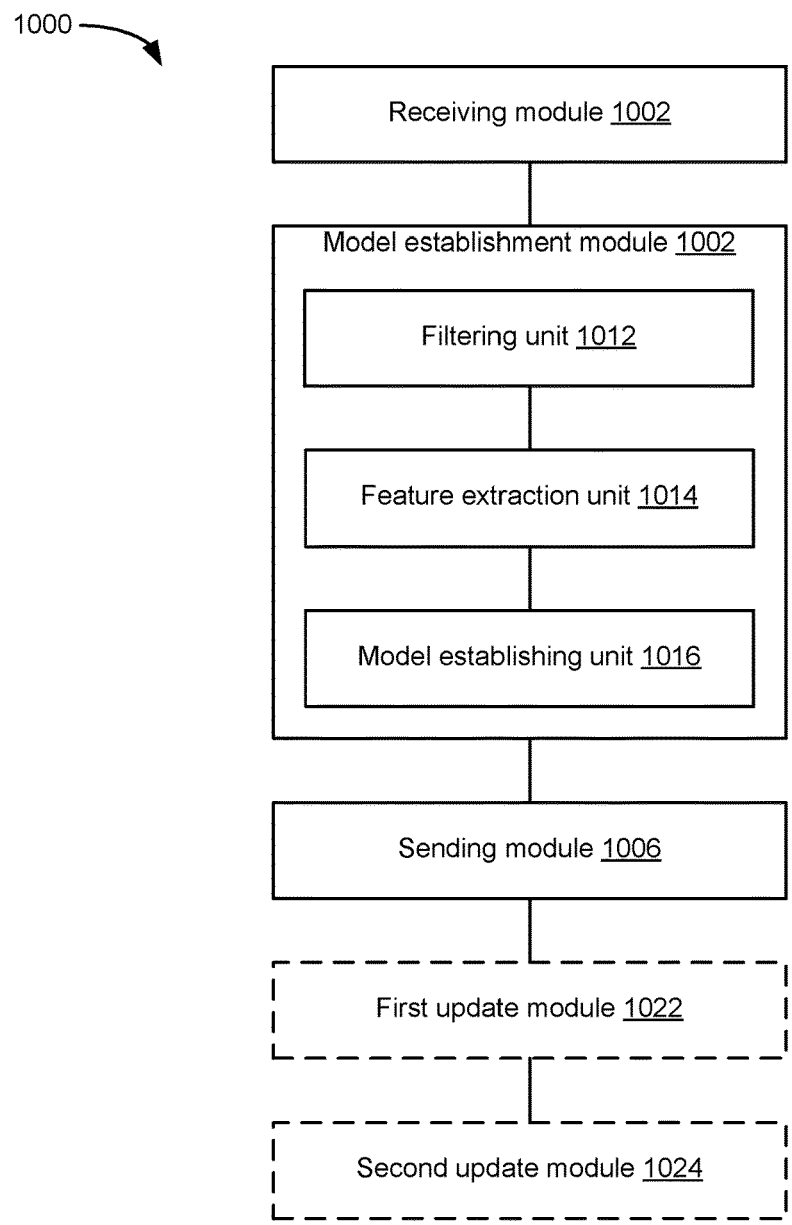
FIG. 10 is a block diagram of a server-side apparatus for displaying a conversation list (or more generally speaking, a "listing of message logs") in accordance with some embodiments.

FIG. 10 is a block diagram of a server-side apparatus 1000 for displaying a conversation list in accordance with some embodiments. In some embodiments, server-side apparatus 1000 may be implemented in whole or in part by software, hardware, or a combination thereof. For example, server-side apparatus 1000 corresponds to server system 108 (FIGS. 1-2) or a component thereof (e.g., server-side module 106, FIGS. 1-2). In some embodiments, server-side apparatus 1000 includes: receiving module 1002, model establishment module 1004, and sending module 1006.

In some embodiments, receiving module 1002 is configured to receive behavior data corresponding to the user's interactions with the conversation list from client-side apparatus 900.

In some embodiments, model establishment module 1004 is configured to establish an algorithm model according to the behavior data received by receiving module 1002 and a preset algorithm (e.g., a linear or logic regression algorithm).

In some embodiments, model establishment module 1004 includes: filtering unit 1012, feature extraction unit 1014, and model establishing unit 1016.

In some embodiments, filtering unit 1012 is configured to filter the behavior data received by receiving module 1002 to obtain a second preset type of data.

In some embodiments, feature extraction unit 1014 is configured to perform feature extraction on the second preset type of data to obtain feature values from the behavior data.

In some embodiments, model establishing unit 1016 is configured to establish the algorithm model according to the feature values extracted by feature extraction unit 1014 and the preset algorithm.

In some embodiments, sending module 1006 is configured to send the algorithm model established by model establishment module 1004 to client-side apparatus 900.

In some embodiments, server-side apparatus 1000 further includes: first update module 1022 and second update module 1024.

In some embodiments, first update module 1022 is configured to update the algorithm model in each data update period according to behavior data received within the data update period.

In some embodiments, second update module 1024 is configured to update the algorithm model in each feature update period according to a data type newly added within the feature update period and the previously received behavior data.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of presenting a listing of message logs, the method comprising:
    at a computing device with one or more processors and memory:
        obtaining a plurality of user-specific models corresponding to a respective user of the computing device, wherein: (i) each of the plurality of user-specific models is used to determine respective listing priorities for message logs based on a respective set of parameters generated based at least in part on previous behavioral data corresponding to the respective user, the behavioral data including identities and relationships of other users involved in each of the message logs relative to the respective user, and a number of messages exchanged between the respective user and the other users involved in each of the message logs, and (ii) the plurality of user-specific models includes a first model corresponding to a first message type, and a second model corresponding to a second message type distinct from the first message type;
        obtaining a request from the respective user to display a listing of message logs corresponding to the respective user, wherein the listing of message logs includes a first message log of the first message type and a second message log of the second message type distinct from the first message type; and
        in response to obtaining the request:
            determining a first listing priority for the first message log based on the first model corresponding to the first message type, the first model being based on a first set of parameters generated based at least in part on the previous behavioral data corresponding to the respective user;
            determining a second listing priority for the second message log based on the second model corresponding to the second message type, the second model being based on a second set of parameters, different from the first set of parameters, generated based at least in part on the previous behavioral data corresponding to the respective user;
            determining a presentation order for the listing of message logs corresponding to the respective user based at least in part on the first listing priority, the second listing priority, and a prioritization preference of the respective user for two or more message types including at least the first message type and the second message type; and
            presenting the listing of message logs corresponding to the respective user in the determined presentation order.

2. The method of claim 1, wherein the first message type and the second message type are distinct message types selected from a group consisting of a public conversation, a private conversation, a one-on-one conversation, a followed private account message board, and a followed public account message board.

3. The method of claim 1, further comprising:
    collecting behavioral data corresponding to the respective user's interactions with the presented listing of message logs;
    generating an abstraction of the collected behavioral data based on respective sets of parameters for the plurality of user-specific models; and
    providing the abstraction of the collected behavioral data to a server, wherein the server updates at least one of the plurality of user-specific models based on the provided abstraction of the behavioral data.

4. The method of claim 3, wherein collecting the behavioral data further comprises:
    determining a set of behavioral data to be collected based on the respective sets of parameters for the plurality of user-specific models; and
    in accordance with the determined set of behavior data to be collected, collecting behavioral data corresponding to the respective user's interactions with the presented listing of message logs.

5. The method of claim 3, further comprising:
    after providing the abstraction of the collected behavioral data to the server, obtaining at least one updated user-specific model corresponding to the respective user, wherein the least one updated user-specific model includes at least one changed parameter.

6. The method of claim 3, wherein generating the abstraction of the collected behavior data based on respective sets of parameters for the plurality of user-specific models further comprises:
identifying, from the collected behavior data, a subset of behavior data relevant to a first parameter of the first model;
identifying a plurality of features present within the subset of behavior data; and
abstracting the subset of behavior data based on the first parameter, and the plurality of features.

7. The method of claim 1, wherein the listing of message logs are displayed in a listing interface, and the method further includes:
detecting a user input selecting a respective message log in the displayed listing of message logs in the listing interface;
determining a count of skipped message logs between the respective message log and one of a top-most message log or a previously selected message log above the respective message log in the displayed listing of message logs; and
providing an indication of the count of skipped message logs to a sever, wherein the server updates at least one of the plurality of user-specific models based on the provided indication of the count of skipped message logs.

8. A computing device, comprising:
one or more processors; and
memory storing one or more programs to be executed by the one or more processors, the one or more programs comprising instructions for:
obtaining a plurality of user-specific models corresponding to a respective user of the computing device, wherein: (i) each of the plurality of user-specific models is used to determine respective listing priorities for message logs based on a respective set of parameters generated based at least in part on previous behavioral data corresponding to the respective user, the behavioral data including identities and relationships of other users involved in each of the message logs relative to the respective user, and a number of messages exchanged between the respective user and the other users involved in each of the message logs, and (ii) the plurality of user-specific models includes a first model corresponding to a first message type, and a second model corresponding to a second message type distinct from the first message type;
obtaining a request from the respective user to display a listing of message logs corresponding to the respective user, wherein the listing of message logs includes a first message log of the first message type and a second message log of the second message type distinct from the first message type; and
in response to obtaining the request:
determining a first listing priority for the first message log based on the first model corresponding to the first message type, the first model being based on a first set of parameters generated based at least in part on the previous behavioral data corresponding to the respective user;
determining a second listing priority for the second message log based on the second model corresponding to the second message type, the second model being based on a second set of parameters, different from the first set of parameters, generated based at least in part on the previous behavioral data corresponding to the respective user;
determining a presentation order for the listing of message logs corresponding to the respective user based at least in part on the first listing priority, the second listing priority, and a prioritization preference of the respective user for two or more message types including at least the first message type and the second message type; and
presenting the listing of message logs corresponding to the respective user in the determined presentation order.

9. The computing device of claim 8, wherein the first message type and the second message type are distinct message types selected from a group consisting of a public conversation, a private conversation, a one-on-one conversation, a followed private account message board, and a followed public account message board.

10. The computing device of claim 8, wherein the one or more programs further comprise instructions for:
collecting behavioral data corresponding to the respective user's interactions with the presented listing of message logs;
generating an abstraction of the collected behavioral data based on respective sets of parameters for the plurality of user-specific models; and
providing the abstraction of the collected behavioral data to a server, wherein the server updates at least one of the plurality of user-specific models based on the provided abstraction of the behavioral data.

11. The computing device of claim 10, wherein collecting the behavioral data further comprises:
determining a set of behavioral data to be collected based on the respective sets of parameters for the plurality of user-specific models; and
in accordance with the determined set of behavior data to be collected, collecting behavioral data corresponding to the respective user's interactions with the presented listing of message logs.

12. The computing device of claim 10, wherein the one or more programs further comprise instructions for:
after providing the abstraction of the collected behavioral data to the server, obtaining at least one updated user-specific model corresponding to the respective user, wherein the least one updated user-specific model includes at least one changed parameter.

13. The computing device of claim 10, wherein generating the abstraction of the collected behavior data based on respective sets of parameters for the plurality of user-specific models further comprises:
identifying, from the collected behavior data, a subset of behavior data relevant to a first parameter of the first model;
identifying a plurality of features present within the subset of behavior data; and
abstracting the subset of behavior data based on the first parameter, and the plurality of features.

14. The computing device of claim 8, wherein the listing of message logs are displayed in a listing interface, and the method further includes:
detecting a user input selecting a respective message log in the displayed listing of message logs in the listing interface;
determining a count of skipped message logs between the respective message log and one of a top-most message log or a previously selected message log above the respective message log in the displayed listing of message logs; and providing an indication of the count of skipped message logs to a sever, wherein the server updates at least one of the plurality of user-specific models based on the provided indication of the count of skipped message logs.

15. A non-transitory computer readable storage medium storing one or more programs, the one or more programs comprising instructions, which, when executed by a computing device with one or more processors, cause the computing device to perform operations comprising:

obtaining a plurality of user-specific models corresponding to a respective user of the computing device, wherein: (i) each of the plurality of user-specific models is used to determine respective listing priorities for message logs based on a respective set of parameters generated based at least in part on previous behavioral data corresponding to the respective user, the behavioral data including identities and relationships of other users involved in each of the message logs relative to the respective user, and a number of messages exchanged between the respective user and the other users involved in each of the message logs, and (ii) the plurality of user-specific models includes a first model corresponding to a first message type, and a second model corresponding to a second message type distinct from the first message type;

obtaining a request from the respective user to display a listing of message logs corresponding to the respective user, wherein the listing of message logs includes a first message log of the first message type and a second message log of the second message type distinct from the first message type; and in response to obtaining the request:
determining a first listing priority for the first message log based on the first model corresponding to the first message type, the first model being based on a first set of parameters generated based at least in part on the previous behavioral data corresponding to the respective user;

determining a second listing priority for the second message log based on the second model corresponding to the second message type, the second model being based on a second set of parameters, different from the first set of parameters, generated based at least in part on the previous behavioral data corresponding to the respective user;

determining a presentation order for the listing of message logs corresponding to the respective user based at least in part on the first listing priority, the second listing priority, and a prioritization preference of the respective user for two or more message types including at least the first message type and the second message type; and presenting the listing of message logs corresponding to the respective user in the determined presentation order.

16. The non-transitory computer readable storage medium of claim 15, wherein the first message type and the second message type are distinct message types selected from a group consisting of a public conversation, a private conversation, a one-on-one conversation, a followed private account message board, and a followed public account message board.

17. The non-transitory computer readable storage medium of claim 15, wherein the instructions cause the computing device to perform operations further comprising:

collecting behavioral data corresponding to the respective user's interactions with the presented listing of message logs;

generating an abstraction of the collected behavioral data based on respective sets of parameters for the plurality of user-specific models; and providing the abstraction of the collected behavioral data to a server, wherein the server updates at least one of the plurality of user-specific models based on the provided abstraction of the behavioral data.

18. The non-transitory computer readable storage medium of claim 17, wherein collecting the behavioral data further comprises:

determining a set of behavioral data to be collected based on the respective sets of parameters for the plurality of user-specific models; and in accordance with the determined set of behavior data to be collected, collecting behavioral data corresponding to the respective user's interactions with the presented listing of message logs.

19. The non-transitory computer readable storage medium of claim 17, wherein the instructions cause the computing device to perform operations further comprising:

after providing the abstraction of the collected behavioral data to the server, obtaining at least one updated user-specific model corresponding to the respective user, wherein the least one updated user-specific model includes at least one changed parameter.

20. The non-transitory computer readable storage medium of claim 17, wherein generating the abstraction of the collected behavior data based on respective sets of parameters for the plurality of user-specific models further comprises:

identifying, from the collected behavior data, a subset of behavior data relevant to a first parameter of the first model;

identifying a plurality of features present within the subset of behavior data; and abstracting the subset of behavior data based on the first parameter, and the plurality of features.

* * * * *